Dec. 31, 1929.  N. W. TRAUTNER  1,741,593
SPARE TIRE LOCK
Filed June 29, 1927
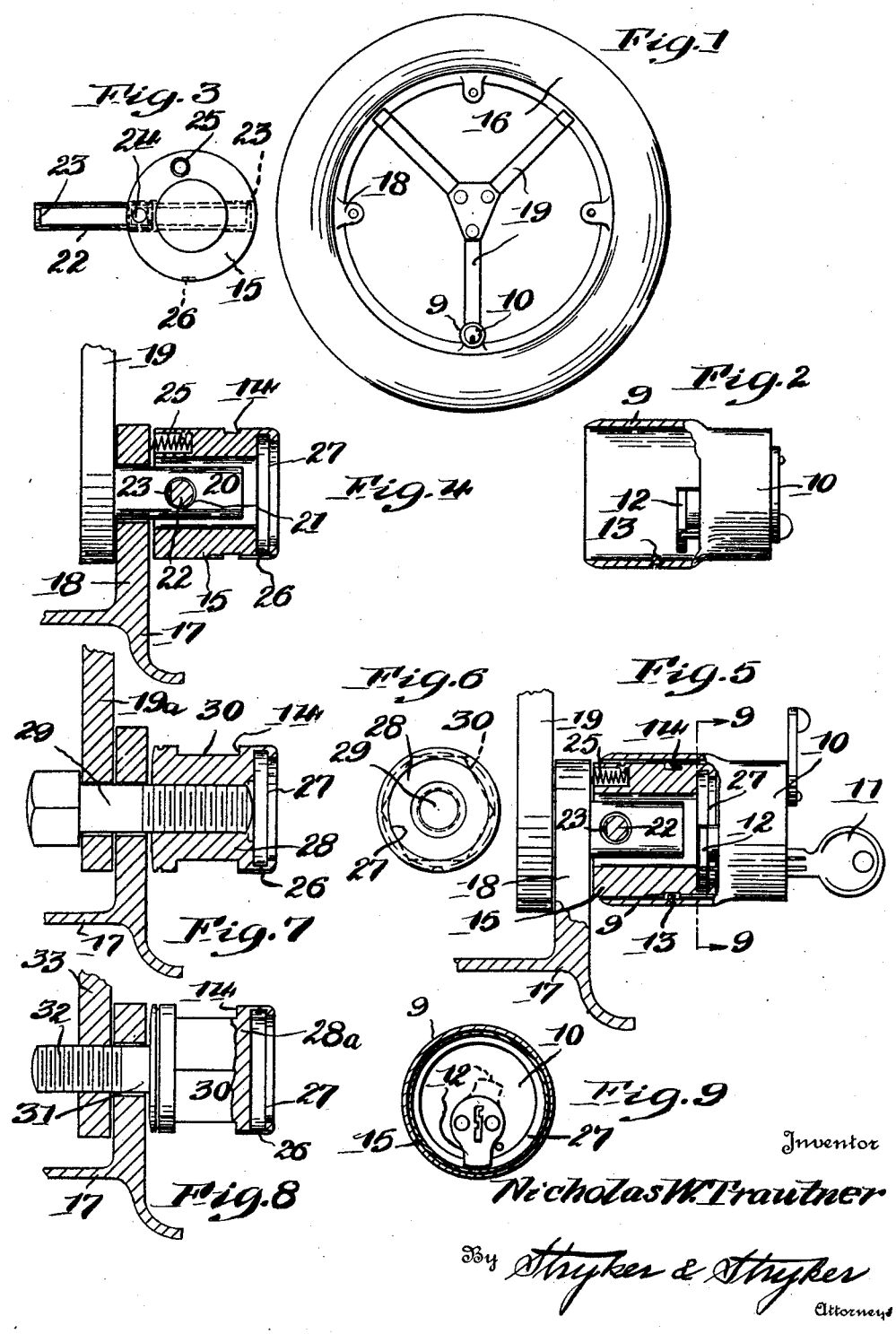
Inventor
Nicholas W. Trautner
By Stryker & Stryker
Attorneys Patented Dec. 31, 1929

1,741,593

UNITED STATES PATENT OFFICE

NICHOLAS W. TRAUTNER, OF ST. PAUL, MINNESOTA

SPARE-TIRE LOCK

Application filed June 29, 1927. Serial No. 202,283.

It is the object of this invention to provide a novel and unusually safe and easily operable guard for spare tires for motor vehicles.

A further object is to reduce the number of parts of such a device to a minimum.

The invention will be best understood by reference to the accompanying drawings in which Figure 1 is an elevation of a spare tire mounted on a supporting bracket of common type and with my improved lock in place thereon; Fig. 2 is a side elevation partially in central vertical section, showing the lock cap or guard casing; Fig. 3 is an end view of my improved retaining nut; Fig. 4 is a central vertical section through the nut, in place on the tire support; Fig. 5 is a side elevation partly in section showing the assembled lock cap and nut in place; Fig. 6 is an end view of an alternate form of nut; Fig. 7 is a central vertical section through the nut shown in Fig. 6, together with the adjacent portions of the tire rim and support; Fig. 8 illustrates an arrangement wherein a nut similar to that shown in Figs. 6 and 7 is formed integral with the stud for securing the tire rim to a suitable support, and Fig. 9 is a section taken on the line 9—9 of Fig. 5.

As best shown in Figs. 2 and 5, I provide a tubular lock cap 9 which is closed at its normally outer end and in which is mounted the lock proper 10 adapted to be operated by a removable key 11. Located eccentrically within the cap 9 is a locking finger 12 arranged to be actuated by the key 11 to extend outward toward the inner surface of the cap 9. Projecting inward from the cylindrical bore of the cap 9 is a lug 13 arranged to engage an annular shoulder 14, formed on a retaining nut 15.

The spare tire 16 may be secured in the usual or suitable manner upon a rim 17 having perforated ears 18 projecting radially inward for securing the rim to a wheel of the vehicle. One of these ears 18 may be employed for securing the rim 17 to a spare tire support or bracket 19. One common form of support 19 has a stud 20 which projects to receive one of the ears 18. This stud 20 is formed with a transverse hole 21 adapted to receive the locking or retaining means for the tire.

My improved nut 15 is of hollow cylindrical shape having a bore adapted to receive the stud 20. A retaining pin 22 slidably fits within a hole extending diametrically through the nut 15. This pin 22 has near each end a stop 23 for preventing complete withdrawal or removal from the nut 15, and a small projection 24 (which may be formed by a center punch) within the bore for the pin 22 is adapted to engage the stops 23. The inner face of the nut 15 is formed with a recess containing a small spiral spring 25 adapted to engage the ear 18. This spring prevents the nut from rattling when in use. The pin 22 is formed to fit the transverse hole 21 in the stud 20 and to be extended therethrough when in the dotted line position shown in Fig. 3.

The lock cap 9 is formed to encase the nut 15, as shown in Fig. 5, and must be withdrawn therefrom to allow removal of said nut. A longitudinal slot 26 extends from the shoulder 14 on the nut 15 to the outer end of the nut. This slot 26 is provided to allow movement of the lug 13 into engagement with the shoulder 14. The bore of the nut 15 near its outer end has an inwardly projecting annular flange 27 for engaging the locking finger 12 on the cap 9.

In the form of the invention shown in Figs. 6 and 7, I provide a nut 28 adapted to be secured to a threaded stud 29 which commonly projects from a different type of tire support 19ª. The nut 28 has the internal flange 27 and is adapted for use with the lock cap 9, but a hexagonal portion 30 upon its exterior is provided to receive a suitable wrench for turning the nut upon the stud 29. In the modification shown in Fig. 8, a stud 31 having an integral head 28ª and a threaded end 32 adapted to engage a tapped hole in a tire support 33 of another type, is employed in place of the bolt and detachable nut shown in the preceding figures.

To apply my improved lock to a tire support of the type shown in Figs. 1, 4 and 5, the nut 15 with the pin 22 withdrawn as shown in Fig. 3 is placed upon the projecting end of the stud 20 and then the pin 22 is extended through the hole 21 in said stud, the spring 25 being compressed by contact with the ear 18. Now the cap 9 is placed upon the nut 15 by moving the lug 13 through the slot 26 into an engagement with the nut behind the shoulder 14. It is to be understood that the locking finger 12 is moved to its retracted or dotted line position shown in Fig. 9 when it is desired to place the cap 9 upon the nut 15. Finally to prevent unauthorized removal of the cap 9, the key 11 is operated to extend the locking finger 12 behind the flange 27. Now the cap 9 is free to rotate upon the nut 15, but its withdrawal therefrom is prevented by the lug 13 as well as the finger 12. It will be evident that in order to remove the cap 9 it is necessary to turn the same to such a position that the lug 13 registers with the slot 26 and to turn the finger 12 out of engagement with the flange 27. The lug 13 guards against forcible prying of the cap 9 off of the nut 15 by breaking or bending the finger 12, said finger being of relatively small strength. The lock is so designed that the locking finger 12 prevents determining the position where the lug 13 is in registry with the slot 26, unless said finger is first retracted.

With the devices shown in Figs. 6 and 7, the operation is similar to that above described except that the nut 28 is turned upon the threaded stud 29 instead of employing the pin 22 to hold the nut 15, having a smooth bore, in place. Similarly, the device shown in Fig. 8 may be employed to secure the tire rim 17 to the support 33 by turning the stud 31 into the threaded hole in said support. The guard cap 9 is caused to encase the head 28ª and is locked in place to prevent access to said head as above described. It will be evident that in addition to the key 11 there are only two separable parts of my device which require manipulation. Any suitable or standard wrench may be used to turn the nut 30, and no wrench or tool is required to secure the nut 15 in place upon the stud 20.

Having described my invention what I claim is new and desire to protect by Letters Patent is:

1. In a device of the class described, the combination with a nut to be guarded, of an external shoulder and an annular flange formed on said nut, a lock cap adapted to encase said nut, a fixed, rigid lug projecting from the inner surface of said cap to engage said shoulder, said nut being formed with a groove to permit insertion of said lug into engagement with said shoulder, a movable locking finger arranged on said cap to be extended into engagement with said flange on the nut and means for extending and retracting said locking finger, said lug and shoulder being arranged to protect said finger against breakage when said finger is in engagement with said flange.

2. In a device of the class described the combination with a nut to be guarded, an external shoulder and an annular, internal flange formed on said nut, a lock cap adapted to encase said nut, a stationary lug projecting from the inner surface of said cap to engage said shoulder, said nut being formed with a groove to permit insertion of said lug into engagement with said shoulder, a movable locking finger arranged on said cap to be extended into engagement with said flange on the nut and means for extending and retracting said locking finger, said lug and shoulder being arranged to protect said finger against breakage when said finger is in engagement with said flange.

3. In a device of the class described the combination with a nut and a stud adapted to receive said nut, said stud having a transverse hole extending therethrough, and said nut having a perforation adapted to register with said hole, a pin arranged to be inserted in said hole and perforation, a lock cap arranged to encase said nut to prevent withdrawal of said pin, a flange formed on said nut and a movable locking finger arranged on said cap to be extended into engagement with said shoulder.

4. In a device of the class described the combination with a cylindrical nut and a stud adapted to revolubly receive said nut, said stud having a transverse hole extending therethrough, and said nut having perforations adapted to register with said hole, a pin slidable in said perforations, and adapted to be extended through said hole, a lock cap arranged to encase said nut to prevent withdrawal of said pin, an annular flange formed on said nut and a movable locking finger mounted on said cap and arranged to be extended into engagement with said flange.

5. In a device of the class described the combination with a nut and a stud adapted to receive said nut, said stud having a transverse hole extending therethrough, and said nut having perforations adapted to register with said hole, a pin slidable in said perforations, and adapted to be extended through said hole, a lock cap arranged to encase said nut and to prevent withdrawal of said pin, an annular shoulder and an annular flange formed on said nut, a lug projecting from the inner surface of said cap to engage said shoulder, said nut having a groove to permit insertion of said lug into engagement with said shoulder, a movable locking finger arranged on said cap to be extended into engagement with said flange on the nut and means for actuating said locking finger.

In testimony whereof, I have hereunto signed my name to this specification.

NICHOLAS W. TRAUTNER.